ized and mixed with an inert gas to provide the
United States Patent

Sturms et al.

[11] 3,991,224

[45] Nov. 9, 1976

[54] WHIPPED FOOD PRODUCT AND METHOD FOR MAKING SAME

[75] Inventors: Robert L. Strums, Arlington Heights; John J. Jonas, Winnetka, both of Ill.

[73] Assignee: Kraftco Corporation, Glenview, Ill.

[22] Filed: Apr. 23, 1975

[21] Appl. No.: 570,607

Related U.S. Application Data

[63] Continuation-in-part of Ser. No. 339,665, Mar. 12, 1973.

[52] U.S. Cl. ..................................... 426/566; 426/564
[51] Int. Cl.² .......................... A23G 3/00; A23G 9/00
[58] Field of Search ..................... 426/564, 565, 566

[56] References Cited

UNITED STATES PATENTS

| | | | |
|---|---|---|---|
| 3,673,106 | 6/1972 | Jonas et el | 426/566 |
| 3,582,357 | 6/1971 | Katz | 426/566 |

FOREIGN PATENTS OR APPLICATIONS

695,310   9/1964   Canada ..................................... 426/566

*Primary Examiner*—Jeanette M. Hunter
*Attorney, Agent, or Firm*—Fitch, Even, Tabin and Luedeka

[57] ABSTRACT

A whipped food product for freezing containing a particular combination of stabilizing agents and a specific whipping agent. An aqueous base containing sodium alginate, carboxymethycellulose and tri-calcium phosphate as the stabilizing agents is combined with a mixture of propylene glycol monostearate and glycerol monostearate as the whipping agent and a flavoring to provide an intermediate product which is subsequently homogenized and mixed with an inert gas to provide the whipped product.

16 Claims, No Drawings

WHIPPED FOOD PRODUCT AND METHOD FOR MAKING SAME

The present application is a continuation-in-part of U.S. Ser. No. 339,655, filed Mar. 12, 1973.

The present invention relates generally to the manufacture of frozen dessert products and more particularly relates to the manufacture of a unique frozen dessert product prepared from natural fruit purees.

Dessert products intended to be consumed while frozen have been known for a long time. The principal frozen dessert products are ice cream, ice milk, sherbet and water ices. Frozen dessert products, particularly ice cream, are very popular and over a billion gallons of such products are consumed in the United States each year. Ice cream is a frozen food product prepared from a mixture of dairy ingredients, sweeteners, stabilizers and emulsifiers which is pasteurized, homogenized, flavored and frozen under agitation while air is incorporated. Ice milk is similar to ice cream but contains less milk fat. Sherbet is a frozen dessert characterized by its tart flavor which results from adding fruit or fruit juices and may also have added fruit acid. It is prepared from the same basic ingredients as ice cream, although the maximum total milk solids content is about 25 percent that of ice cream. Frozen water ices are a frozen product prepared from water, sugar and fruit juices, stabilizer, with or without additional acid and color, and containing no dairy product. Water ices differ from ice cream in that the overrun, or amount of air incorporated during the manufacturing process is substantially lower than that of ice cream.

Water ices are popular with people who desire the cool and pleasant mouth feel of a frozen dessert but who desire to have less fat in such frozen desserts. However, water ices are not a wholly satisfactory substitute for other frozen desserts containing fat in that they have a dense, icy characteristic. Numerous attempts have been made to provide frozen dairy products with reduced levels of fat which still retain the eating and mouth feel characteristics of the more popular frozen desserts, such as ice cream, ice milk and sherbet. Such lower fat requirements are desirable to provide reduced calories and reduced fat intake for those persons on restricted diets.

It would be desirable to provide a frozen dessert product having a reduced level of fat which has the texture, melting properties and mouth feel of dairy frozen desserts but with a reduced level of fat. Moreover, it would be desirable to provide a unique frozen dessert product utilizing natural fruit flavorings which has the general characteristics of dairy type frozen dairy dessert products and does not have the icy characteristics previously associated with water ices.

Canadian Pat. No. 695,310 to Lee, which issued Sept. 29, 1964, describes a method for preparing frozen dessert products from natural fruit flavorings. However, frozen dessert products prepared in accordance with Canadian Patent 695,310 do not have freeze-thaw stability and do not retain a desired foam structure when held at room temperature for substantial periods of time. It is desirable to provide frozen dessert products from natural fruit flavorings which have a stable foam structure and which retain a foam structure during and after the frozen dessert product is thawed.

Accordingly, it is a principal object of the present invention to provide a novel frozen dessert product having a reduced level of fat. It is another object of the present invention to provide a whipped food product suitable for freezing which has a reduced level of fat when compared to dairy type frozen dessert formulations. It is a further object of the present invention to provide a novel whipped food product suitable for freezing and a method for the manufacture thereof which has a reduced level of fat and which is prepared substantially from natural fruit materials.

These and other objects of the present invention will become more apparent from the following detailed disclosure and the accompanying claims.

Generally, in accordance with various features of the invention, a method is provided for preparing a whipped food product suitable for freezing. The whipped food product when frozen provides a novel frozen dessert product with reduced levels of fat. In the method, an aqueous sweetened base having a particular combination of stabilizing agents is provided. The aqueous base is combined with a particular whipping agent and a flavoring material to provide a homogenious intermediate product. The flavoring material is preferably a natural fruit puree. The intermediate product is then mixed with an inert gas to provide a whipped food product having a particular overrun which is suitable for freezing.

The aqueous base includes a sweetening agent, a combination of stabilizing agents, and may include non-volatile flavoring materials. Suitable sweetening agents include sucrose, corn syrup solids, dextrose, artificial sweeteners, such as saccharin and cyclamates, and mixtures thereof. To provide suitable texture and mouth feel characteristics in the whipped finished product, the intermediate product prior to whipping should have a solids content of from about 25 percent to about 50 percent by weight. Since the flavoring materials which are added to the aqueous base have varying levels of sugar, the level of use of the various sugars is adjusted in the aqueous base to provide a desired level of solids in the finished product. Such adjustment is made by varying the ratio of sucrose, dextrose, corn syrup solids and artificial sweeteners to provide the desired sweetness level and also the desired solids level in the finished product.

The stabilizing agent is a mixture of sodium alginate, carboxymethylcellulose and tri-calcium phosphate wherein the sodium alginate is from about 40 to about 60 percent of the mixture, the tri-calcium phosphate is from about 15 to about 40 percent of the mixture and the carboxymethylcellulose is about 15 to about 40 percent of the mixture. The stabilizing agent mixture is used at a level of from about .10 to about 1.5 percent by weight of the finished product.

As indicated, non-volatile flavoring materials may also be added to the aqueous base. Such non-volatile flavoring materials include, but are not limited to, cocoa, chocolate, edible acids, salts, spices, non-fat milk solids, and whey solids.

In the preparation of the aqueous base, a dry pre-blend of the dry components to be used in the base is first prepared. The dry pre-blend is added slowly with agitation to a desired level of water. The water is first preferably warmed to a temperature of from about 90 to about 130° F. to aid in dispersion of the dry pre-blend. Agitation is continued until an aqueous dispersion of the dried pre-blend and the water is obtained. The aqueous base is then heated with adequate agitation to a temperature sufficient to effect pasteurization of the aqueous base. Suitable pasteurization conditions are heating to a temperature of 160–165° F. for 20 minutes. After pasteurization, the aqueous base is cooled with agitation to a temperature of from about 70 to about 90° F. and is held at the cooled temperature for further processing.

The whipping agent of the invention is a particular fatty monoester combination which has been characterized as being an emulsifier system as disclosed in U.S. Pat. No. 3,453,116 to Freund, issued July 1, 1969 or U.S. Pat. No. 3,673,106 to Jonas, issued June 27, 1972. The emulsifier systems described in the aforementioned patents are combinations of saturated fatty acid monoesters of polyhydric alcohols which have been stabilized in the alpha crystaline form by combining the fatty acid monoester with a stabilizing agent selected from ionic surface active salts, and non-ionic surface active salt compounds containing atoms having strong electronegative charge. The saturated fatty acid monoester of a polyhydric alcohol is preferably a propylene glycol monoester in combination with a glycerol monoester. Such combinations are referred to herein as "monester combination." Particularly effective combinations of the monoesters comprise between about 20 percent and 60 percent of the glycerol monoester, and between about 40 percent and 80 percent of the 1,2, propylene glycol monoester.

It is generally recognized that fatty acid monoesters can exist in a number of different crystal forms and that their functionality and water dispersibility is dependent upon their crystal form. The fatty acid monoester is known to undergo a morphological transition after solidification from a melted state. Immediately after being solidified from a molten state, lower melting crystal species, designated as alpha and sub-alpha, are formed, which spontaneously undergo a transition to the thermodynamically stable higher melting beta prime and beta crystal forms. This transition is recognized as the cause of certain functional deterioration of fatty acid monoesters during storage. Consequently, it is considered to be within the scope of the present invention to use such fatty acid monoesters and monoester combinations as whipping agents in the present invention immediately after solidification from the melted state, while the fatty acid monoester is in the alpha and sub-alpha form and prior to the time that such fatty monoesters have had an opportunity to undergo a transition to a thermodynamically stable higher melting state. All of the thermodynamically unstable crystal and semi-vitreous forms of fatty acid monoester emulsifiers are generally referred to herein as the "alpha form" and more stable thermodynamic forms are generally referred to in the following as the "beta form."

The fatty monoester combinations of the present invention may be used immediately after solidification and while the fatty monoester combination is in the alpha form. The fatty monoester combination may also be combined and stabilized when so desired with a transition inhibitor such as ionic surface active salts, as described in U.S. Pat. No. 3,453,116. The fatty acid monoester combination may also be stabilized in the alpha form by means of a non-surface active salt compound transition inhibitor having a strong electronegative charge, as described in U.S. Pat. No. 3,673,106 to Jonas, issued June 27, 1972.

The whipping agent is used at a level of from about .10 to about 3.0 percent by weight (dry basis), based on the weight of the finished dessert product. The whipping agent may be used in the dry solid form or a hydrated form. For ease in handling and measuring, it is preferred that the whipping agent be first hydrated by admixture and dispersion in water prior to combining the whipping agent with the aqueous sweetened base previously described. However, as indicated, the whipping agent may be added to the aqueous sweetened base in the solid form. Such dispersion in water may be effected by adding the solidified whipping agent to water and agitating the mixture in a high sheer mixing apparatus, such as a household blender. It is preferred to prepare an aqueous dispersion of the whipping agent having from about 5 to about 25 percent whipping agent in the dispersion.

The whipping agent is added to the aqueous sweetened base as the aqueous sweetened base is being agitated. The mixture of the aqueous sweetened base and the whipping agent is then mixed with volatile flavoring materials to provide an intermediate product. Such volatile flavoring materials include purees of natural fruits, such as pineapple, strawberry, cherry, apple, peach, blueberry, prune, grape, pear, blackberry and other fruits, and may also include volatile artificial flavors, such as certain edible acids, organic esters and aldehydes and alcohol-based essences, such as vanilla. The addition of the volatile flavoring materials to the mixture of the aqueous sweetened base and the hydrated whipping agent provides an intermediate product which is suitable for whipping to provide a whipped product that may be frozen. Prior to whipping, it is preferred that the intermediate product be subjected to vigorous mixing so as to provide a homogeneous dispersion of the ingredients in the product. Any suitable method of mixing may be used. A preferred method for effecting dispersion of the ingredients is to pump the intermediate product in a closed system provided with a valve or other suitable means capable of establishing a back pressure of from about 25 p.s.i.g. to about 150 p.s.i.g.

The intermediate product is then whipped and a gas is incorporated into the intermediate product to provide the desired level of overrun. The whipping may be effected by a batch or continuous process. A preferred method of whipping the intermediate product is to pump the intermediate product through a suitable continuous mixer, such as that identified by the tradename, Oakes mixer or an ice cream freezer, and to incorporate an inert gas into the intermediate product as it passes through the mixer. A planetary mixer, such as that identified by the tradename Hobart mixer, has been found suitable for whipping the intermediate produce in a batch process. It is important to establish a proper level of overrun in the intermediate product during the whipping step. In this connection, if the overrun falls below about 150 percent, the product has a soft, greasy mouth feel and is considered unsuitable for freezing and consumption while frozen. If the overrun is above about 300 percent, the product, when frozen, has an airy texture and mouth feel and is also considered unsuitable. It should be noted that the preferred range of overrun is substantially greater than the overrun usually established in frozen dessert products. However, at the preferred level of overrun, the whipped products of the present invention, when frozen, impart a mouth feel, texture and flavor substantially similar to previously known frozen dessert products.

The fatty monoester combination useful in the present invention have been characterized as effective emulsifying agents, particularly in the preparation of aqueous fatty emulsions. It should be understood, however, that the fatty monoester combinations do not function in the whipped food products of the present invention as emulsifying agents. The whipped food products of the invention are prepared from a substantially homogeneous aqueous phase and are substantially fat free. The fatty monoester combinations function as whipping agents and not as emulsifying agents. While not wishing to be bound by any theory it is believed that the fatty monoester combinations provide a unique aerated structure when the intermediate product of the invention is whipped. When certain flavoring materials, particularly fruit purees containing pectin, are present in the intermediate product, the fatty monoester whipping agent is suitable to provide an aerated structure with improved stability compared to the use of other known emulsifying agents. However, the stability of the aerated structure is still further improved by the presence of the combination of stabilizing agents of the invention.

To establish the desired level of overrun and texture in the intermediate product during a continuous whipping process, the pressure which is established on the product as it is being pumped through the continuous mixer should be gradually released. If the pressure is suddenly released after the product exits from the mixer, the foam structure may collapse and an undesirable texture may be imparted in the product when frozen. A pressure in the range of from about 10 to about 80 p.s.i.g. is usually established on the intermediate product as it is pumped through a continuous whipper. This pressure should be released over a period of from about 5 to about 50 seconds. The pressure may be gradually released by a suitable valve which is designed to establish back pressure and to gradually release the back pressure as the product flows in a conduit after leaving the mixer. In this connection, a suitable method for gradually releasing the pressure is to attach a suitable length of conduit to the output of the mixer and to permit the conduit to release pressure through friction encountered by the flow of the whipped product as it exits from the mixer.

After being whipped, the dessert product is then frozen within a reasonable time. In this connection, the whipped dessert product does not undergo substantial meltdown after the whipping operation has been performed. No particular precautions are required in effecting freezing of the whipped dessert product, and any suitable temperature below about 28° F. may be used during the freezing step.

The following examples further illustrate various features of the present invention, but are intended to in no way limit the scope of the invention, which is defined in the appended claims.

EXAMPLE I

A strawberry frozen dessert product is prepared in accordance with the method of the invention. A dry mixture of 6265 grams of corn syrup solids, 3087 grams of sucrose, 136 grams of sodium alginate, 70 grams of tricalcium phosphate and 70 grams of carboxymethylcellulose is prepared. The dry mixture is added slowly, with mild agitation, to 13,620 grams of water maintained at a temperature of 110–120° F. in a 10 gallon conical stainless steel jacketed vat to provide an aqueous sweetened base. The aqueous sweetened base is then heated with mild agitation to a temperature of 160–165° F. for a period of 20 minutes so as to pasteurize the aqueous sweetened base.

690 grams of an aqueous whipping agent is then prepared. This aqueous whipping agent contains 69 grams of the dry whipping agent and 621 grams of water. The whipping agent comprises 27.6 grams of propylene glycol monostearate, 27.6 grams of glycerol monostearate and 13.8 grams of sodium stearyl fumarate. After addition of the hydrated whipping agent to the aqueous sweetened base, the mixture is vigorously agitated for five minutes to provide a creamy mixture. Thereafter, 10,078 grams of sliced strawberries are added to the mixture with adequate agitation to thoroughly disperse the strawberries throughout the mixture. The mixture is further cooled to 65° F. after addition of the strawberry slices. 41.8 grams of malic acid and 20.8 grams of citric acid are then added to the mixture to complete formation of an intermediate product.

The intermediate product is then pumped in a closed circuit against a back pressure to provide a thoroughly emulsified product. The pumping is by means of a positive displacement pump which feeds the product in a close loop into the outlet of a centrifugal pump. The centrifugal pump is operated at full speed and produces a back pressure of 75 p.s.i.g. to the closed loop. After complete emulsification has been effected, the intermediate product is cooled to a temperature of 55° F.

The intermediate product is then passed through an Oakes mixer (Model MB4) to provide a whipped product suitable for freezing. The intermediate product is passed through the Oakes mixer at an input feed setting of 3.0–3.5 lbs. per minute at a rotor speed of 1,000 r.p.m. Nitrogen gas is injected into the intermediate product as it passes through the Oakes mixer. The nitrogen gas is injected at a pressure of 100 p.s.i.g. and sufficient nitrogen is injected to provide an overrun of 220–230 percent.

The pressure on the intermediate product of about 55 p.s.i.g. is gradually released over a period of about 12 seconds by attaching a 25 foot length of hose having an inside diameter of ½ inch to the outlet o the Oakes mixer. The temperature of the intermediate product prior to entering the Oakes mixer is 55° F. and the temperature at the outlet from the Oakes mixer is 60° F.

The whipped product is then packaged in 8 ounce containers and is frozen in a commercial freezer maintained at a temperature of −10° F. After freezing, the product can removed from the freezer and immediately consumed. The frozen dessert product provided by the method of the invention has a creamy texture and pleasing taste and mouth feel.

EXAMPLE II

A chocolate flavored frozen dessert product is prepared in accordance with the method of Example I. The chocolate frozen dessert product has the following ingredients at the indicated levels:

Aqueous Sweetened Base

| Ingredients | Weight, grams |
| --- | --- |
| Sucrose | 8354 |
| Cocoa powder | 1294 |
| Sodium alginate | 154 |
| Tricalcium phosphate | 77 |
| Carboxymethylcellulose | 46 |
| Water | 18,205 |
| Non-fat dry milk solids | 2066 |

Whipping Agent

| Ingredients | Weight, grams |
| --- | --- |
| Propyleneglycol monostearate | 76.27 |
| Glycerol monostearate | 50.85 |
| Sodium stearoyl-2-lactylate | 31.78 |
| Water | 1430.1 |

Volatile Flavoring Material

| | Volume |
| --- | --- |
| Vanilla flavor | 40% alcohol 15 ml. |
| | 6% vanilla solids |
| | 54% water |

The above ingredients are prepared in accordance with the method of Example I to provide a whipped chocolate product having an overrun of 220-230 percent. The whipped product when frozen provides a desirable flavored dessert product with pleasing eating characteristics and a smooth texture.

EXAMPLE III

An applesauce frozen dessert product is prepared using the whipping agent of the present invention. To 450 grams of applesauce is added 4.5 grams (dry basis) of the aqueous whipping agent described in Example I. The whipping agent is spray dried prior to use. The applesauce with added whipping agent is then whipped to provide an overrun of 220-230 percent. The whipped frozen dessert product is then frozen by placing the dessert product in a freezer maintained at $-10°$ F.

A whipped applesauce dessert product is also prepared in accordance with the teachings of Canadian Pat. No. 695,310. 4.5 grams of glycerol monostearate is added to 450 grams of applesauce. The mixture is heated to 145° F. and is then immediately cooled to about 30° F. over a period of 60 minutes. The cooled mixture is then whipped to provide a dessert product having an overrun of 175 percent. This dessert product was further whipped to provide a dessert product having an overrun of 500 percent. Both whipped dessert products are then frozen by placing the dessert product in a freezer maintained at $-10°$ F.

A further sample was prepared in accordance with Canadian Pat. No. 695,310 wherein the heated mixture of applesauce and glycerol monostearate is whipped without cooling to provide a dessert product having an overrun of 285 percent. The whipped dessert product is then frozen by placing the frozen dessert product in a freezer maintained at $-10°$ F.

The frozen applesauce dessert product which is made with the whipping agent of the present invention and the frozen applesauce dessert product made in accordance with Canadian Pat. No. 695,310 are removed from the freezer and are held at room temperature. The whipped dessert product made in accordance with the present invention retained its foam structure for a period of two days and still retained a substantially foamed structure after a period of five days exposure at 72° F. The frozen dessert products made in accordance with Canadian Pat. No. 695,310 had lost a substantial level of foam structure after one day's exposure at 72° F. and had lost substantially all foam structure after a period of two days exposure at a temperature of 72° F.

The composition and method of the present invention are suitable for providing a novel frozen dessert product with several distinctions over prior frozen dessert products. The frozen dessert products of the invention have less calories per volume of dessert product and there is substantially no fat in the dessert product.

1. A method for preparing a whipped food product suitable for freezing to provide a frozen dessert comprising providing an aqueous base, said aqueous base comprising water, a sweetening agent and a stabilizing agent, said stabilizing agent being a mixture of from about 40 to about 60 percent by weight of sodium alginate, from about 15 to about 40 percent by weight of tri-calcium phosphate and from about 15 to about 40 percent by weight of carboxymethylcellulose, said stabilizing agent mixture being present at a level of from about 0.1 to about 1.5 percent by weight of the intermediate product formed in a subsequent step, combining said base with a whipping agent and flavoring materials, said whipping agent being a mixture of propylene glycol monostearate and glycerol monostearate, mixing said combination to provide a homogeneous intermediate product, whipping said intermediate product to provide a whipped food product having an overrun of from about 150 percent to about 300 percent which is suitable for freezing to provide a frozen dessert product which can be subsequently thawed and maintained at room temperature for a substantial period of time without losing its whipped structure.

2. A method in accordance with claim 1 wherein said whipping agent is hydrated prior to combining with said aqueous base so as to provide an aqueous dispersion of said whipping agent.

3. A method in accordance with claim 1 wherein said whipping agent is substantially in the alpha crystalline form.

4. A method in accordance with claim 1 wherein said whipping agent comprises from about 20 percent to about 60 percent of glycerol monostearate and between about 40 percent and about 80 percent of propylene glycol monostearate.

5. A method in accordance with claim 1 wherein said aqueous base includes a sweetening agent selected from sucrose, corn syrup solids, dextrose, artificial sweeteners and mixtures thereof.

6. A method in accordance with claim 1 wherein said intermediate product has a solids content of from about 25 percent to about 50 percent by weight.

7. A method in accordance with claim 1 wherein said intermediate product is whipped while under pressure.

8. A method in accordance with claim 7 wherein said pressure is in the range of about 40 to about 80 p.s.i.g.

9. A method in accordance with claim 7 wherein said pressure is gradually released after said intermediate product has been whipped.

10. A method in accordance with claim 1 wherein said flavoring materials are volatile flavoring materials selected from purees of natural fruits, artificial flavors, and mixtures thereof.

11. A whipped food product suitable for freezing to provide a frozen dessert product which can subsequently be thawed and maintained at room temperature for a substantial period of time without losing its whipped structure, comprising a homogeneous mixture of an aqueous base, said aqueous base comprising water, a sweetening agent and a stabilizing agent, said stabilizing agent being a mixture of from about 40 to about 60 percent by weight of sodium alginate, from about 15 to about 40 percent by weight of tri-calcium phosphate and from about 15 to 40 percent by weight of carboxymethylcellulose, a whipping agent and flavoring materials, said whipping agent being a mixture of propylene glycol monostearate and glycerol monostearate, said stabilizing agent mixture being present at a level of from about .1 to 1.5 percent by weight of said aqueous base, said whipped food product having an overrun of from about 150 percent to about 300 percent.

12. A whipped food product in accordance with claim 11 wherein said whipping agent comprises from about 20 percent to about 60 percent glycerol monostearate and between about 40 percent and 80 percent of propylene glycol monostearate.

13. A whipped food product in accordance with claim 11 wherein said sweetening agent is selected from sucrose, corn syrup solids, dextrose, artificial sweeteners and mixtures thereof.

14. A whipped food product in accordance with claim 11 wherein said whipping agent is substantially in the alpha crystalline form.

15. A whipped food product in accordance with claim 11 wherein said whipped food product has a solids content of from about 25 percent to about 50 percent by weight.

16. A whipped food product in accordance with claim 11 wherein said flavoring materials are selected from purees of natural fruit, artificial flavors and mixtures thereof.

* * * * *